United States Patent
Cantiani et al.

(10) Patent No.: US 6,485,767 B1
(45) Date of Patent: Nov. 26, 2002

(54) USE OF CELLULOSE MICROFIBRILS IN DRY FORM IN FOOD FORMULATIONS

(75) Inventors: Robert Cantiani, Lyons (FR); Magali Knipper, Paris (FR); Sophie Vaslin, Saint-Cloud (FR)

(73) Assignee: Rhodia Chimie, Boulogne Billancourt, Cedex (FR)

( * ) Notice: Subject to any disclaimer, the term of this patent is extended or adjusted under 35 U.S.C. 154(b) by 0 days.

(21) Appl. No.: 09/530,400

(22) PCT Filed: Oct. 16, 1998

(86) PCT No.: PCT/FR98/02228

§ 371 (c)(1), (2), (4) Date: Aug. 15, 2000

(87) PCT Pub. No.: WO99/21435

PCT Pub. Date: May 6, 1999

(30) Foreign Application Priority Data

Oct. 29, 1997 (FR) .......................................... 97 13560

(51) Int. Cl.[7] .............................................. A23L 1/0534
(52) U.S. Cl. .................... 426/96; 426/658; 426/661; 426/570; 426/571; 426/564; 426/565; 426/569; 426/605
(58) Field of Search .......................... 426/96, 658, 661, 426/571, 570, 564, 569, 565, 605; 106/162.8; 127/37

(56) References Cited

U.S. PATENT DOCUMENTS

| | | | |
|---|---|---|---|
| 4,659,388 A | | 4/1987 | Innami ..................... 106/163.1 |
| 5,342,636 A | | 8/1994 | Bakshi ....................... 426/302 |
| 5,487,419 A | * | 1/1996 | Weibel ............................ 162/9 |
| 5,964,983 A | * | 10/1999 | Dinand et al. ................. 162/27 |
| 6,224,663 B1 | * | 5/2001 | Cantiani et al. ........... 106/162.8 |
| 6,231,657 B1 | * | 5/2001 | Cantiani et al. ........... 106/162.8 |
| 6,306,207 B2 | * | 10/2001 | Cantiani et al. ........... 106/162.8 |
| 6,312,669 B1 | * | 11/2001 | Cantiani et al. ............... 424/49 |

FOREIGN PATENT DOCUMENTS

| | | |
|---|---|---|
| EP | 0 120471 | 10/1984 |
| EP | 0 537 554 | 4/1993 |
| EP | 0 726 356 | 8/1996 |
| WO | WO 95/02966 | 2/1995 |
| WO | WO 98/02487 | 1/1998 |

OTHER PUBLICATIONS

International Search Report, No date.

* cited by examiner

Primary Examiner—Nina Bhat

(57) ABSTRACT

The invention concerns the use, in dry form, of a combination of substantially amorphous microfibrils with a crystallinity index not more than 50%, with at least a polyhydroxylated compound, as additive for food formulations, the content of this combination being more than 0% and less than 20% by weight relative to the total weight of the food formulation.

16 Claims, No Drawings

USE OF CELLULOSE MICROFIBRILS IN DRY FORM IN FOOD FORMULATIONS

This application is an application under 35 U.S.C. Section 371 of International Application Number PCT/FR98/02228, filed on Oct. 16, 1998.

The present invention relates to the use, in dry form, of cellulose microfibrils combined with at least one polyhydroxylated compound, as an additive in food formulations.

Microfibrillar cellulose is a product that is well known and used in many fields, such as the food sector, since it gives the media in which it is present specific properties in terms of viscosity and stability, for example.

In general, cellulose microfibrils are used in the form of dispersions, which correspond, in fact, to the form in which they are obtained by carrying out fibrillation operations.

Thus, European patent EP 295 865 proposes the use of cellulose microfibril suspensions containing parenchymal cells as an additive for food formulations. These microfibrils are obtained by carrying out a process which consists in treating, in a first step, the plant pulp at an acidic or basic pH, and then, in a second step, in carrying out a heat treatment at high temperature for a short period. The pulp thus treated is then subjected to a mechanical shear so as to obtain microfibrils, which are then separated and optionally blanched. This process has the particular feature of entirely removing the pectins and hemicelluloses present at the surface of the microfibrils.

European patent application EP 726 356 proposes, inter alia, to use, as an additive in food formulations, essentially amorphous cellulose microfibrils whose surface is charged with carboxylic acids.

Although the advantage of microfibrils is, of course, not brought into doubt here, the fact that they are used in the form of dispersions of relatively low concentration (conventionally less than 10%, by dry weight, of microfibrils) does not represent an advantage as regards the storage (location and stability of the suspension) or even the use (metering).

Now, microfibrils are not compounds which can be dried without specific precautions. If such is the case, microfibrils in dry form are not redispersible, on account of the very strong hydrogen bonding which binds the fibrils together.

It is thus known practice to carry out the drying of the said microfibrils in the presence of additives. However, the amounts generally used are very high. It is not uncommon for these contents to represent at least 50% by weight, or even 100% by weight, relative to the weight of microfibrils.

This may be disadvantageous, especially for cellulose microfibrils which have specific rheological properties that are different from those of the additive added. The reason for this is that the additive introduced in such amounts masks the rheological profile of the microfibrils in a certain manner.

As may be observed, no food formulations obtained from cellulose microfibrils in dry form which are readily redispersible are currently available.

Thus, a subject of the present invention is the use, in dry form, of a combination of essentially amorphous cellulose microfibrils having a degree of crystallinity of less than or equal to 50%, with at least one polyhydroxylated compound, as an additive for food formulations, the content of this combination being greater than 0% and less than 20% by weight relative to the total weight of the food formulation.

It has been observed that the combined cellulose microfibrils, in dry form, used according to the invention are, in the first place, readily redispersible. The term "readily" means that it is not necessary to use high shear means such as those resulting from the use of a machine of Ultra-Turrax type.

In addition, combined microfibrils, in dry form, once redispersed, regain at least 50% of their initial viscosity.

Moreover, it has been found that the dried, combined microfibrils have very good texturizing properties, i.e. they have a twin role as stabilizer and thickener in the formulation into which they are introduced.

The dried combined cellulose microfibrils can also legitimately at least partially replace fats for the preparation of reduced-fat formulations.

It should be noted that the organoleptic properties of the dried, combined cellulose microfibrils are such that they give the formulation similar consistency and unctuousness to those of the products which they replace.

The dried combined cellulose microfibrils similarly have noteworthy overrun properties. In other words, the incorporation of combined microfibrils gives the overrun formulations very large stability and foam-elasticity properties.

The dried combined microfibrils similarly have the advantage of replacing one or more products, which simplifies the use of the formulation.

In addition, the amounts of dried combined microfibrils, relative to the additive(s) which they replace, are lower.

It should be noted that the dried combined microfibrils can be used as substitutes for animal gelatin, usually of bovine origin, which represents an appreciable advantage in terms of health.

Other advantages and characteristics of the present invention will emerge more clearly on reading the description and the examples which follow.

As has been indicated previously, a subject of the present invention is the use, in dry form, of a combination of essentially amorphous cellulose microfibrils with at least one polyhydroxylated compound as an additive for food formulations.

The expression "essentially amorphous" refers to microfibrils whose degree of crystallinity is less than or equal to 50%. According to one specific variant of the present invention, the degree of crystallinity is between 15 and 50%. Preferably, the degree of crystallinity is less than 50%.

The cellulose microfibrils forming part of the composition of the formulation according to the present invention are obtained from cells preferably consisting of at least about 80% primary walls. Such characteristics are present with cellulose based on parenchymal cells. For example, citrus fruit, such as lemons and grapefruit in particular, and sugar beet, are plants comprising such cells.

Preferably, the amount of primary walls is at least 85% by weight. More particularly, cellulose derived from sugar beet pulp is used.

According to one preferred embodiment of the invention, the microfibrils are surface-charged with carboxylic acids and acidic polysaccharides, alone or as a mixture.

The term "carboxylic acid" refers to simple carboxylic acids, as well as salts thereof. These acids are preferably chosen from uronic acids, or salts thereof. More particularly, the said uronic acids are galacturonic acid, glucuronic acid or salts thereof.

As acidic polysaccharides, mention may be made of pectins, which are more particularly polygalacturonic acids. These acidic polysaccharides can be present as a mixture with hemicelluloses.

One very advantageous embodiment of the invention consists of microfibrils whose surface is at least charged with galacturonic acid and/or polygalacturonic acid.

It should be noted that it is not a case here of a simple mixture between the said microfibrils and the acids and polysaccharides, but rather a strict combination between these two types of compound. The reason for this is that the process for preparing the microfibrils is such that the acids and polysaccharides are not totally separated from the fibres, but instead still remain at the surface thereof, giving them quite specific properties. Thus, it has been observed that it was not possible to obtain the same properties if these acids and/or polysaccharides were totally separated from the microfibrils during their preparation in order for them to be added thereafter.

The cellulose microfibrils moreover have a cross section of between about 2 and about 10 nm. More particularly, the microfibril cross section is between about 2 and about 4 nm.

The specific microfibrils forming part of the composition of food formulations have such characteristics on account of the use of a quite specific preparation process, which will now be described.

It should be noted that this process has been described inter alia in patent application EP 726,356, to which reference may be made for further details.

Firstly, the said process is more particularly carried out on sugar beet pulp, after it has undergone a preliminary step of extraction of the sucrose, according to the methods known in the art.

The preparation process comprises the following steps:
(a) first acidic or basic extraction, after which a first solid residue is recovered,
(b) optionally, second extraction, carried out under alkaline conditions, of the first solid residue, after which a second solid residue is recovered,
(c) washing of the first or second solid residue,
(d) optionally, bleaching of the washed residue,
(e) dilution of the third solid residue obtained after step (d) so as to obtain a solids content of between 2 and 10% by weight,
(f) homogenization of the dilute suspension.

In step (a), the term "pulp" is intended to refer to wet, dehydrated pulp stored by ensilage or partially depectinized.

The extraction step (a) can be carried out in acidic medium or in basic medium.

For an acidic extraction, the pulp is suspended in an aqueous solution for a few minutes so as to homogenize the acidified suspension at a pH of between 1 and 3, preferably between 1.5 and 2.5.

This operation is carried out with a concentrated solution of an acid such as hydrochloric acid or sulphuric acid.

This step may be advantageous for removing the calcium oxalate crystals which may be present in the pulp, and which, on account of their highly abrasive nature, can cause difficulties in the homogenization step.

For a basic extraction, the pulp is added to an alkaline solution of a base, for example sodium hydroxide or potassium hydroxide, with a concentration of less than 9% by weight, more particularly less than 6% by weight. Preferably, the concentration of the base is between 1 and 2% by weight.

A small amount of a water-soluble antioxidant, such as sodium sulphite $Na_2SO_3$, may be added in order to limit the oxidation reactions of the cellulose.

Step (a) is generally carried out at a temperature of between about 60° C. and 100° C., preferably between about 70° C. and 95° C.

The duration of step (a) is between about 1 hour and about 4 hours.

During step (a), partial hydrolysis takes place with release and solubilization of most of the pectins and hemicelluloses, while at the same time retaining the molecular mass of the cellulose.

The solid residue is recovered from the suspension obtained from step (a) by carrying out known methods. Thus, it is possible to separate the solid residue by centrifugation, by filtration under vacuum or under pressure, with filter gauzes or filter presses, for example, or else by evaporation.

The first solid residue obtained is optionally subjected to a second extraction step carried out under alkaline conditions.

A second extraction step is carried out when the first step has been carried out under acidic conditions. If the first extraction has been carried out under alkaline conditions, the second step is only optional.

According to the process, this second extraction is carried out with a base preferably chosen from sodium hydroxide and potassium hydroxide, whose concentration is less than about 9% by weight, preferably between about 1% and about 6% by weight.

The duration of the alkaline extraction step is between about 1 and about 4 hours. It is preferably equal to about 2 hours.

After this second extraction, if it is carried out, a second solid residue is recovered.

In step (c), the residue derived from step (a) or (b) is washed thoroughly with water in order to recover the residue of cellulosic material.

The cellulosic material from step (c) is then optionally bleached, in step (d), according to the standard methods. For example, a treatment with sodium chlorite, with sodium hypochlorite or with hydrogen peroxide in a proportion of 5–20% relative to the amount of solids treated can be carried out.

Different concentrations of bleaching agent can be used, at temperatures of between about 18° C. and 80° C., preferably between about 50° C. and 70° C.

The duration of this step (d) is between about 1 hour and about 4 hours, preferably between about 1 and about 2 hours.

A cellulosic material containing between 85 and 95% by weight of cellulose is thus obtained.

After this bleaching step, it may be preferable to wash the cellulose thoroughly with water.

The resulting suspension, which has optionally been bleached, is then redituted in water to a proportion of 2 to 10% solids, before undergoing a homogenization step.

The homogenization step corresponds to a mixing or blending operation or any operation of high mechanical shear, followed by one or more passages of the cell suspension through an orifice of small diameter, subjecting the suspension to a pressure drop of at least 20 MPa and to a high-speed shear action, followed by a high-speed deceleration impact.

The mixing or blending is carried out, for example, by passage(s) through the mixer or blender for a period ranging from a few minutes to about an hour, in a machine such as a Waring Blendor fitted with a four-blade impeller or a pan mill mixer or any other type of blender, such as a colloidal mill.

The actual homogenization will advantageously be carried out in a homogenizer such as a Manton Gaulin in which the suspension is subjected to a shear action at high speed and pressure in a narrow passage and against an impact ring. Mention may also be made of the Micro Fluidizer, which is a homogenizer mainly consisting of a compressed-air motor which creates very high pressures, an interaction chamber in which the homogenization operation takes place (elongational shear, impacts and cavitations) and of a low-pressure chamber which allows depressurization of the dispersion.

The suspension is introduced into the homogenizer preferably after preheating to a temperature of between 40 and 120° C., preferably between 85 and 95° C.

The temperature of the homogenization operation is maintained between 95 and 120° C., preferably above 100° C.

The suspension in the homogenizer is subjected to pressures of between 20 and 100 MPa and preferably above 50 MPa.

Homogenization of the cellulosic suspension is obtained by a number of passages which can range between 1 and 20, preferably between 2 and 5, until a stable suspension is obtained.

The homogenization operation can advantageously be followed by a high mechanical shear operation, for example in a machine such as the Sylverson Ultra-Turrax machine.

The cellulose microfibrils according to the invention are combined with at least one polyhydroxylated compound.

More particularly, the polyhydroxylated compound is chosen from carbohydrates and derivatives thereof, and polyols.

As regards the carbohydrates, mention may be made most particularly of linear or cyclic $C_3$–$C_6$ and preferably $C_5$ or $C_6$ monosaccharides, oligosaccharides, polysaccharides and fatty derivatives thereof such as sucroesters or fatty acid sucroesters, carbohydrate alcohols and mixtures thereof.

Non-limiting examples of monosaccharides which are suitable are fructose, mannose, galactose, glucose, talose, gulose, allose, altrose, idose, arabinose, xylose, lyxose and ribose.

Oligosaccharides which may be mentioned, inter alia, are sucrose, maltose and lactose.

The polysaccharides may be of animal, plant or bacterial origin.

In addition, they can be used in anionic or nonionic form.

Xanthan gum, succinoglycans, carrageenans and alginates are representative components of anionic polysaccharides.

As regards the nonionic polysaccharides, mention may be made in particular of galactomannans, such as guar gum, carob gum, starch and its nonionic derivatives, and nonionic cellulose derivatives.

As regards the carbohydrates, mention may be made, without any intention of being limited thereto, of fatty acid sucroesters, fatty acid esters, carbohydrate alcohols such as sorbitol or mannitol; carbohydrate acids such as gluconic acid, uronic acids such as galacturonic acid or glucuronic acid, as well as their salts, and carbohydrate ethers such as carboxymethyl cellulose.

As regards the polyols, glycerol, pentaerythritol, propylene glycol, ethylene glycol and/or polyvinyl alcohols can be used in the food formulations.

It should be noted that the compounds described above can be used alone or as a mixture.

According to a first particularly advantageous variant, the polyhydroxylated compound is at least carboxymethyl cellulose.

Cellulose is a polymer consisting of glucose monomer units. The carboxylic group is introduced in a manner which is known per se, by reacting chloroacetic acid with cellulose.

The degree of substitution corresponds to the number of carboxymethyl groups per glucose unit. The maximum theoretical degree is 3.

Depending on whether or not the degree of substitution is greater than 0.95, or less than or equal to this value, it is specified that the carboxymethyl cellulose has a high or low degree of substitution, respectively.

According to a second variant, the polyhydroxylated compound is a combination of carboxymethyl cellulose with at least one compound chosen from nonionic and anionic monosaccharides, oligosaccharides and polysaccharides and derivatives thereof, and carbohydrate derivatives such as carbohydrate alcohols, acids and ethers.

In particular, the carboxymethyl cellulose is used in combination with at least one of the following compounds: xanthan gum, sorbitol, sucrose.

The total content of polyhydroxylated compound is at least 5% by weight relative to the microfibrils and to the said polyhydroxylated compound, and not more than 50% by weight relative to the same reference.

Preferably, this content is between 5 and 30% by weight relative to the same reference. In an entirely advantageous manner, the content is between 10 and 30% and preferably between 15 and 30% by weight.

Optionally, besides the abovementioned polyhydroxylated compound, the cellulose microfibrils can be combined with at least one co-additive chosen from:

compounds of formula $(R^1R^2N)COA$, in which formula $R^1$ or $R^2$, which may be identical or different, represent hydrogen or a $C_1$–$C_{10}$, preferably $C_1$–$C_5$, alkyl radical, A represents hydrogen, a $C_1$–$C_{10}$, preferably a $C_1$–$C_{15}$, alkyl radical or the group $R'^1R'^2N$ with $R'^1$ and $R'^2$, which may be identical or different, representing hydrogen or a $C_1$–$C_{10}$, preferably $C_1$–$C_5$, alkyl radical.

As regards the compounds of $(R^1R^2N)COA$ type, it is preferred to use compounds comprising two amide functions. Preferably, urea is used as co-additive.

The cellulose microfibrils forming part of the composition of the food formulations are obtained from the drying of a dispersion of microfibrils in the presence of an additive and optionally of a co-additive.

It may likewise be envisaged to use a dispersion of such a composition.

Such compositions have especially been the subject of the patent applications PCT/FR 97/01290 published under the number WO 98/02486 and PCT/FR 97/01291 published under the number WO 98/02487; reference may be made to these patents as regards the nature of the additives, co-additives and combinations preferred, the respective proportions of the additives and co-additives, and their method of preparation.

The co-additive content is such that the total content of polyhydroxylated compound and of co-additive is at least 5% by weight relative to the microfibrils and to the said polyhydroxylated compound, and not more than 50% by weight relative to the same reference.

Preferably, the said co-additive content is such that the abovementioned total content is between 5 and 30% by weight. In an entirely advantageous manner, the content is between 10 and 30% and preferably between 15 and 30% by weight.

The process for preparing such microfibril compositions consists, firstly, in preparing the cellulose microfibrils from suitable cellulosic pulp by carrying out a hydrolysis, optionally followed by at least one step of bleaching of the pulp thus treated. Everything which has been mentioned previously in this respect remains valid and will not be repeated here.

More particularly, in a first step, at least some of the additive and optionally co-additive(s) are added to the microfibril suspension, which has optionally undergone at least one homogenization cycle. Next, in a second step, a step of drying of the suspension thus supplemented is carried out.

According to a first variant, the addition of at least some of the additive and optionally co-additive is carried out after the homogenization step.

A first particularly suitable method consists in adding at least some of the additive and optionally co-additive to the suspension after the homogenization step, after this suspension has undergone at least one concentration step.

As a guide, the concentration step(s) take(s) place by filtration, centrifugation or evaporation of some of the water from the suspension, by precipitation, for example in an alcohol, by freezing-thawing, by dialysis, etc.

According to this embodiment, the concentration operation can be carried out until a solids content of about 35% by weight is obtained.

The introduction of the additive and optionally co-additive is carried out in a manner which is known per se, i.e. by any means which allows homogeneous introduction of a solution, a suspension or a powder to a suspension which tends to have the consistency of a paste. For example, mention may be made of blenders, extruders and mixers.

This operation can be carried out over a wide temperature range, more particularly between room temperature and 80° C.

A second method consists in adding at least some of the additive and optionally co-additive to the suspension after the homogenization step, before this suspension has undergone at least one concentration step.

In this case, the concentration step(s) which take(s) place after the addition of additive and optionally of co-additive is (are) carried out in the same way as indicated above.

According to a second advantageous variant, the introduction of at least some of the additive and optionally co-additive is carried out before or during the homogenization step. When it is indicated that the supplementation takes place during the homogenization step, this means that the additive and optionally the co-additive are introduced when the pulp has undergone at least one cycle of the homogenization step.

The supplementation takes place according to the two methods indicated in the context of the first variant.

Prior to the actual drying step, it may be advantageous to carry out shaping of the suspension which has been concentrated as mentioned previously. This shaping is carried out in a manner which is known to those skilled in the art. Mention may be made in particular, without, however, intending to be limited thereto, of extrusion and granulation.

According to a particularly advantageous variant, the drying step is carried out so as to maintain not less than 3% by weight of water relative to the weight of the solid obtained. More particularly, the weight of water maintained is between 10 and 30% by weight.

The drying advantageously takes place in air, although it may be envisaged to carry it out under an inert gas, such as nitrogen.

It should also be noted that it is preferred to carry out the drying in an atmosphere whose degree of humidity is controlled so as to be able to maintain the desired moisture content in the composition.

The drying temperature should limit any degradation of the carboxylic acids, of the acidic polysaccharides, of the hemicelluloses and/or of the additives and co-additives. It is more particularly between 30 and 80° C., preferably between 30 and 60° C.

It should be noted that it would not constitute a departure from the context of the present invention to carry out a drying operation in several steps, some of which would use the means indicated above for the concentration step.

After the drying step, the composition obtained can be blended.

The content of cellulose microfibrils, comprising the polyhydroxylated compound, and optionally the co-additive, is greater than 0% and less than or equal to 20% by weight relative to the total weight of the food formulation. More particularly, this content is between 0.01 and 5% by weight relative to the same reference. Preferably, it is between 0.03 and 3% by weight relative to the same reference.

The food formulations in which the combined microfibrils are added are conventionally dispersions. The term "dispersion" denotes emulsions of liquids, emulsions of gases and liquids, suspensions of liquids and solids, or any other system combining these possibilities.

The food formulations are obtained very simply, using the conventional methods for preparing food formulations depending on their type. Thus, the combined microfibrils, in dried form, are mixed with other required ingredients of the formulation and the whole is then homogenized.

The temperature at which the formulation is prepared does not present any particular problems. It should advantageously be noted, in this respect, that the formulations comprising the combined microfibrils can be sterilized without any damage to their use properties. Another advantage of the combined cellulose microfibrils according to the invention is that it is possible to prepare the food formulations without needing to preheat the ingredients.

It should moreover be pointed out that the cellulose microfibrils are compatible and substantially retain their properties despite the diversity of the food formulations (pH values, ionic strengths, composition).

The parameters which can be measured to determine the texture of the food formulations are of rheological nature, and consist essentially in measuring the viscosity and the elasticity. The viscosity corresponds to the resistance to flow under an irreversible deformation, and the elasticity is the response of the formulation to a reversible deformation. They also make it possible to give indications regarding the stability of the formulations, which is particularly desired, especially when the formulation comprises at least two components that are not miscible with each other. Thus, a high viscosity slows down certain emulsion-destabilizing phenomena, such as creaming and flocculation. A high value for the elasticity, which represents the structural result of interactions between the various components, allows the formulation tp undergo shear stresses, such as those encountered when the formulation is served with a spoon or spread, for example, without becoming destabilized, without any breaking of the droplets formed, thus avoiding coalescence of the formulation.

The Theological measurements of flow viscosity are measured using a controlled-stress rheometer or a controlled-shear-gradient rheometer, or more simply using a Brookfield viscometer.

The flow rheology makes it possible to evaluate the flow threshold of the formulation, which represents the force to be supplied to destroy the structure of the medium and force it to flow. The flow rheology also makes it possible to quantify the ease of a formulation to flow when the imposed shear increases (shear-thinning behaviour) as well as the viscosity level at a given shear rate.

These flow rheology data are representative of the behaviour of the formulation while it is being chewed, transferred, overrun, etc.

The elasticity measurements are carried out under a dynamic regime using a rheometer which makes it possible to function in oscillations. It is thus possible to determine the values of G', the storage modulus (or elastic modulus), and G", the loss modulus (or viscous modulus), as well as the deformation range in which the moduli do not vary. It should be noted that, in general, the behaviour is linear at low deformations.

The objective of these rheological characteristics is to demonstrate the viscoelastic behaviour of the formulations and to compare them with each other.

The combined microfibrils, in dry form, used in the context of the present invention give food formulations a specific Theological profile of shear-thinning type. This type of Theological behaviour has the consequence of entailing a reduction in the viscosity of the formulation containing it when this formulation is subjected to shear stresses, whether these are during the preparation of the formulation or during its consumption. It should be noted that this reduction in viscosity in the mouth also makes it possible to promote the release of the flavours present in the formulation.

The combined microfibrils used, in dry form, have very good properties as agents for bringing about an overrun state. Specifically, the introduction of the microfibrils makes it possible to improve the stability of the film separating the gas from the other ingredients of the formulation, and to give it good elasticity.

By way of illustration, food formulations comprising the dried combined microfibrils have high storage modulus G' values, for example of between 1500 and 4000 Pa, measured at a frequency of 1 Hz, Which are higher than those measured for formulations comprising xanthan gum or gelatin.

Thus, the combined microfibrils, in dry form, can be used legitimately as additives in formulations intended to be rendered in an overrun state, such as whipped creams, chantilly creams, toppings and ice-creams. The combined microfibrils can similarly be used in compositions such as mayonnaises, vegetable mousses, mousses comprising proteins, such as meat mousses, fish mousses, and mousses comprising albumin, such as meringues.

Besides the overrun properties, the combined microfibrils also have an action of controlling and inhibiting crystal growth. Now, this property is highly desired for foods which undergo temperature cycles (freezing, heating), such as ice-creams, or frozen foods. The reason for this is that it is essential for such formulations to be free, for as long as possible, of ice crystals which would give the said formulations an undesirable texture, such as the loss of a smooth constitution.

Moreover, the combined microfibrils give the formulations in which they are used a texture similar to that of formulations comprising the replaced additives.

Another advantage of the combined microfibrils used in the invention is that they can advantageously replace several compounds ordinarily used in food formulations intended to obtain overrun products. The formulations are thus all the more simplified.

Furthermore, combined cellulose microfibrils represent a means for effectively replacing animal gelatin, which is an additional advantage in terms of hygiene.

The combined cellulose microfibrils used according to the invention can similarly be used as additives in the formulations of vinaigrettes, fruit juices, vegetable juices, milk-based drinks and more particularly chocolate-flavoured milk-based drinks.

Specifically, combined microfibrils are good stabilizers and thickeners of emulsions and/or dispersions of this type.

In the specific case of chocolate-flavoured milk-based drinks, the dried combined cellulose microfibrils used according to the invention are not only compatible with milk-based media, but also make it possible to reduce the phenomenon of depletion (sedimentation of the chocolate) which appears in conventional formulations based on xanthan gum as stabilizer.

The combined cellulose microfibrils can also form a part of the composition of yoghurts, for example as viscosity modifiers. In an entirely advantageous manner, the combined microfibrils according to the invention do not prevent fermentation from taking place.

The viscosity-modifying properties and their "creamy" consistency make combined cellulose microfibrils particularly suitable for incorporation into formulations for pastes for spreading and margarines.

In addition, and this represents an additional advantage, since they represent only a small supply of calories, they can legitimately, totally or partially replace fats, in order to prepare reduced-fat compositions.

It should be noted that the combined cellulose microfibrils do not impair the tastes of the foods into which they are introduced.

It has even been found that they have flavour-enhancing properties.

Concrete but non-limiting examples of the invention will now be given.

In the examples which follow, the flow viscosities were measured using a Brookfield RVT 20-2 viscometer, at room temperature.

The viscosities are expressed in mPa.s.

The storage modulus values were determined using a Carrimed CSL100 controlled-stress rheometer.

They were measured under a dynamic regime: oscillating regime—frequency from 0.01 to 10 Hz.

The deformation range (or storage plateau) is determined by carrying out coupled scanning at a given frequency and the range in which the moduli G' do not vary is determined.

The values are expressed in Pa.

The measurements of the degrees of overrun were carried out in the following manner:

Mousse is introduced into a beaker of known volume (v) and known mass, it is struck three times and is then levelled out.

The beaker is weighed to determine the mass of mousse it contains (m).

The degree of overrun corresponds to the following ratio: [m(g)/v(ml)×100.

The degree of overrun is expressed in %.

EXAMPLE 1

The object of this example is to prepare, in dry form, cellulose microfibrils (CMF) comprising carboxymethylcellulose (CMC).

The stock dispersion of cellulose microfibrils is obtained in accordance with the process described in Example 20 of patent application EP 726 356; it comprises 2.3% of cellulose microfibrils and is prehomogenized using an Ultra-Turrax machine at 14,000 rpm for one min. per 100 g of dispersion).

The carboxymethylcellulose used has a degree of substitution equal to 1.2; of average viscosity (product Blanose 12M8P from Aqualon).

The CMC is dissolved in distilled water and then added to the stock dispersion of (CMF) and the whole is stirred with a deflocculating paddle-stirrer at 1000 rpm for 30 min.

The amount of carboxymethylcellulose added is 15% relative to the weight of CMC.

The mixture is then poured into dishes, after which it is dried in a ventilated oven at 40° C., down to a solids content of 77%, monitored by assaying the water with the aid of an infrared thermal balance.

The dried mixture is then ground in a coffee mill, after which it is screened through a 500 μm screen.

EXAMPLE 2

The subject of the example is a topping formulation.

Two formulations are prepared:
2.1: according to the invention (comprising the CMFs obtained in Example 1),
2.2: sodium caseinate/sodium alginate.

The compositions of the formulations are as follows:

| Components: | Formulation 2.1 (% by weight) | Formulation 2.2 (% by weight) |
|---|---|---|
| 1) Oily phase | | |
| Hydrogenated palm oil | 7.6 | 7.6 |
| Acetic ester of mono-diglycerides | 0.76 | 0.76 |
| Lactic ester of mono-diglycerides | 0.76 | 0.76 |
| 2) Aqueous phase | | |
| Sugar | 8.35 | 8.35 |
| Skimmed milk powder | 7.44 | 7.44 |
| Maltodextrin (Glucidex ® 19) | 4.6 | 4.6 |
| Sodium caseinate | — | 1.5 |
| Sodium alginate | — | 0.02 |
| CMF (Example 1) | 1 | — |
| Water | qs 100 | qs 100 |

(a) Aqueous Phase:

The amount of water required is weighed in a beaker fitted with a deflocculating paddle-stirrer and the mixture of powders described in the above table is dispersed with vigorous stirring (500 rpm). Stirring is continued for 5 minutes after the introduction of the powders.

(b) Oily Phase:

The fat and the emulsifiers are heated on a water bath at 70° C. in a beaker.

The oily phase is then added to the aqueous phase with stirring at 1000 rpm. Stirring is continued for 5 minutes after the introduction of the oily phase. During this operation, compensation is made for the water which evaporates off.

The mixture is then homogenized in an Ultra-Turrax machine for 2 minutes at 20,000 rpm.

The mixture is cooled to a temperature below 10° C., after which the process to render it in overrun state is carried out. This takes place using a Kenwood mixer at maximum speed for 3 minutes at a temperature close to 5° C.

The results are collated in the table below:

| | 2.1 | 2.2 |
|---|---|---|
| Viscosity before rendering in overrun state | 1500 mPa · s | 1700 mPa · s |
| Degree of overrun | 350% | 250% |
| G' (measured at 1 Hz) | 1800 Pa | 1600 Pa |

This table shows that the formulation according to the invention is easier to render in overrun state due to the fact that its viscosity is slightly lower.

In addition, the formulation according to the invention is, firstly, more gelled (higher G' at high frequency) and has an improved degree of overrun.

What is claimed is:

1. A process for the preparation of a food formulation comprising the steps of:
    a) providing a starting food or food formulation,
    b) mixing said starting food or food formulation with an amount greater than 0% and less than 20% by weight, relative to the total weight of the food formulation, of a combination of amorphous cellulose microfibrils in dry form having a degree of crystallinity of less than or equal to 50%, with at least one polyhydroxylated compound, to obtain the food formulation, and
    c) recovering the obtained food formulation.

2. A process according to claim 1, wherein the amount of the combination is between 0.01 and 5%.

3. A process according to claim 1, wherein the microfibrils are surface-charged with a carboxylic acid or a polysaccharide acid.

4. A process according to claim 1, wherein the cellulose microfibrils are obtained from cells having at least about 80% primary walls.

5. A process according to claim 1, wherein the content of polyhydroxylated compound is between 5 and 50% by weight relative to the microfibrils and to said polyhydroxylated compound.

6. A process according to claim 5, wherein the content of polyhydroxylated compound is between 5 and 30%.

7. A process according to claim 1, wherein the polyhydroxylated compound is a carbohydrate or a polyol.

8. A process according to claim 7, wherein the polyhydroxylated compound is a linear $C_3$–$C_6$ monosaccharide, cyclic $C_3$–$C_6$ monosaccharide, an oligosaccharide, a polysaccharide, a fatty acid sucroester, or a carbohydrate alcohol.

9. A process according to claim 8, wherein the polyhydroxylated compound is carboxymethylcellulose.

10. A process according to claim 8, wherein the polyhydroxylated compound is xanthan gum, succinoglycan, carrageenan, or alginate.

11. A process according to claim 8, wherein the polyhydroxylated compound is galactomannan, or starch.

12. A process according to claim 8, wherein the polyhydroxylated compound is sorbitol or sucrose.

13. A process according to claim 1, wherein the microfibrils further comprises a co-additive of formula $(R'^1R'^2N)COA$, wherein $R^1$ or $R^2$, which are identical or different, represent hydrogen or a $C_1$–$C_{10}$ alkyl radical, A represents hydrogen, a $C_1$–$C_{10}$ alkyl radical or a group $R'^1R'^2R$ wherein $R'^1$ and $R'^2$, which are identical or different, are hydrogen or a $C_1$–$C_{10}$ alkyl radical.

14. A process according to claim 13, wherein the amount of cellulose microfibrils combined with at least one polyhydroxylated compound, and with at least one co-additive, in dry form, is greater than 0% and less than or equal to 20% by weight relative to the total weight of the food formulation.

15. A process according to claim 14, wherein the amount of cellulose microfibrils combined with at least one polyhydroxylated compound is between 0.01 and 5% by weight.

16. A process according to claim 1, wherein the food formulation is a whipped cream, a chantilly cream, a topping, an ice-cream, a mayonnaise, a vegetable mousse, a meat mousse, a fish mousse, a meringue, a vinaigrette, a fruit juice, a vegetable juice, or a milk-based drink.

* * * * *